J. HUMBRECHT.
PERISCOPE.
APPLICATION FILED JUNE 7, 1910.

976,370.

Patented Nov. 22, 1910.

Witnesses
May S. Trimble
Paul H. Frank

Inventor
Jules Humbrecht
by
Dickerson, Brown, Raegener & Matty
his Attorneys

UNITED STATES PATENT OFFICE.

JULES HUMBRECHT, OF GROSS-LICHTERFELDE, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

PERISCOPE.

976,370.     Specification of Letters Patent.     Patented Nov. 22, 1910.

Application filed June 7, 1910. Serial No. 565,583.

*To all whom it may concern:*

Be it known that I, JULES HUMBRECHT, citizen of the German Empire, and resident of Gross-Lichterfelde, near Berlin, Germany, have invented certain new and useful Improvements in Periscopes, of which the following is a specification.

My invention relates to object sighting apparatus especially for use in submarine and submergible boats and has for its purpose the production of an instrument which allows the observation of an image of the object viewed either by means of an ocular with one single eye or on a ground glass preferably with both eyes. For allowing such double use of the instrument same is provided in accordance with this invention with an adjustable receiver within the instrument casing provided with an ocular and a ground glass in such arrangement with relation to each other that depending upon the adjustment of said casing an image of the object viewed may be observed either on said ground glass or through said ocular.

An embodiment of an instrument in accordance with this invention is represented on the annexed drawing in which—

Figure 1:
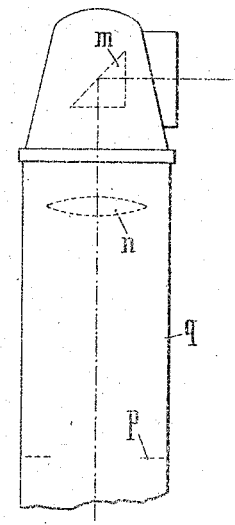
Figure 2:
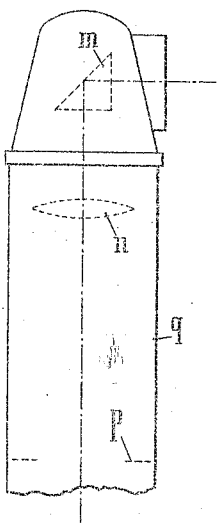
Figure 3:
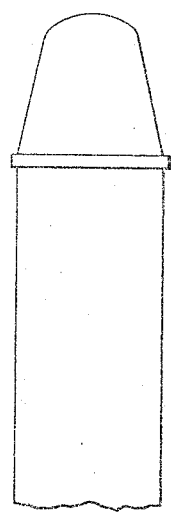
Figure 3:
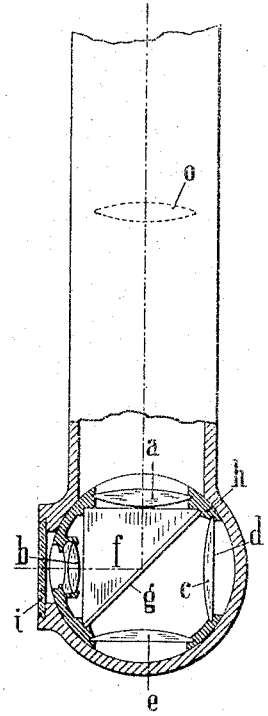
Figure 3:
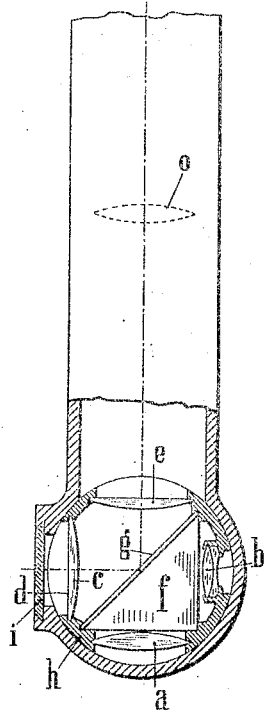
Figure 3:
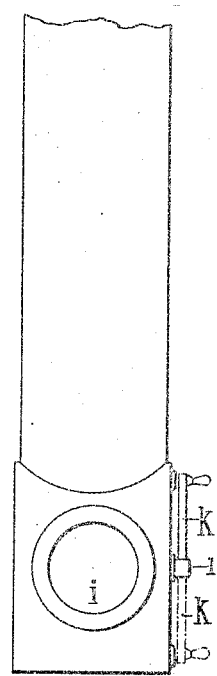

Figure 1 shows a lateral view of the instrument partly in axial section, the adjustable receiver being illustrated in the position in which it allows the observation of the image through the ocular. Fig. 2 shows the instrument likewise in lateral view and axial-section with the receiver in the position for observation of the image on the ground glass. Fig. 3 is a lateral view of the instrument looked at at a right angle to the direction of view supposed in the case of Figs. 1 and 2.

In the embodiment of the instrument the ocular is shown as a so-called angular-ocular comprising two parts $a$, $b$ arranged rectangularly to each other. The ground glass is shown in form of a lens $c$ being provided on its outer side with a plain ground image surface $d$. The ground glass lens $c$ is coordinated to the further lens $e$ angularly disposed to said ground glass lens and forming a magnifying glass.

Between the ground glass system and the ocular system a double sided reflecting mirror is provided which turns one of its sides to the lenses of the ocular and the other to the lenses of the ground glass system. The double reflecting mirror is shown as being formed from the rectangular prism $f$ with silver coated hypotenuse surface, which is covered by a glass-plate $g$ forming a mirror silvered on its back side contacting with the silvered hypotenuse surface of the prism. This plate $g$ is made so thin that the observer is unable to perceive double images produced by reflection on the front and on the back surface of the glass-plate. Ocular, ground glass system and double reflecting mirror or prism and glass-plate system are arranged within a casing $h$ rotatably disposed within a chamber of the main casing of the instrument, said chamber being provided with an opening for observation water tightly closed by a protecting glass $i$. The casing $h$ is provided with a stud $l$ water tightly carried through the main casing and provided with a lever $k$ allowing the rotation of the casing $h$ from outside the main casing of the instrument.

In Fig. 3 two different positions of lever $k$ are indicated corresponding to the two different positions of the casing $h$ within the main casing shown in Figs. 1 and 2. The special arrangement of the ocular and of the ground glass system with relation to the double sided reflector $f$, $g$ allows in a simple manner the observation through the ocular on the one hand and on the ground glass on the other hand without alteration of the position of the observer. For this purpose it is only necessary to construct the optical elements for the ocular observation in such a manner that the point of vision is chosen in accordance with the conditions of the ground glass system and vice versa.

The image forming elements of the instrument are only indicated diagrammatically in Figs. 1 and 2 of the drawing as consisting of a triangular prism $m$ an object glass $n$ and reversing lens $o$ for the reversion of the object glass image in the plane of diaphragm $p$. The last named optical elements are arranged within the main case $q$ of the instrument.

What I claim is:

1. Object sighting apparatus especially for use in submarine and submergible boats comprising a main casing, an image forming optical device therein and a receiver, the image forming optical device adapted to receive rays of light and to direct same to the receiver for observation, the receiver comprising a casing carrying an ocular and a ground glass and adjustable within the main casing in such a manner that depending upon the adjustment of said casing an image of the object viewed may be observed either on said ground glass or through said ocular.

2. Object sighting apparatus especially for use in submarine and submergible boats comprising a main casing, an image forming optical device therein and a receiver, the image forming optical device adapted to receive rays of light and to direct same to the receiver for observation, the receiver comprising a casing carrying an ocular and a ground glass, and means for rotating said casing within the main casing from outside, the ocular and ground glass carrying casing being adapted to be adjusted within the main casing by rotation in such a manner that depending upon the adjustment an image of the object viewed may be observed either on said ground glass or through said ocular.

3. Object sighting apparatus especially for use in submarine and submergible boats comprising a main casing, an image forming optical device therein and a receiver, the image forming optical device adapted to receive rays of light and to direct same to the receiver for observation, the receiver comprising a casing carrying an ocular, a ground glass, a double sided reflecting mirror and means for rotating said casing within the main casing the plane of the double sided reflecting mirror substantially coinciding with the axis of rotation of the ocular and ground glass carrying casing and turning one reflecting side toward the ocular and the other toward the ground glass.

4. Object sighting apparatus especially for use in submarine and submergible boats comprising a main casing, an image forming optical device therein and a receiver, the image forming optical device adapted to receive rays of light and to direct same to the receiver for observation, the receiver comprising a casing carrying an ocular, a ground glass, a prism having a surface forming a separating wall between the ocular and the ground glass, said prism surface being provided with a transparent cover, a double sided reflecting layer between said prism surface and transparent cover and means for rotating said casing within the main casing, the plane of the double sided reflecting layer substantially coinciding with the axis of rotation of its carrying casing.

5. Object sighting apparatus especially for use in submarine and submergible boats comprising a main casing, an image forming optical device therein and a receiver, the image forming optical device adapted to receive rays of light and to direct same to the receiver for observation, the receiver comprising a casing carrying an ocular, a ground glass, a prism having a surface forming a separating wall between the ocular and the ground glass, a reflecting coating on said prism surface, a thin glass-plate provided on one side with a reflecting coating, said coating contacting with said coated prism surface and means for rotating said casing within the main casing, the prism surface contacting with the thin glass-plate substantially coinciding with the axis of rotation of the rotatable casing.

6. Object sighting apparatus especially for use in submarine and submergible boats comprising a main casing, an image forming optical device therein and a receiver, the image forming optical device adapted to receive rays of light and to direct same to the receiver for observation, the receiver comprising a casing carrying an ocular and a ground glass and rotatable within the main casing of the instrument, the ocular and the ground glass being arranged in such a manner that on suitable rotation of said casing an image of the object viewed may be observed either on the ground glass or through the ocular without materially altering the position of the eye of the observer.

In testimony whereof I have signed this specification in the presence of two subscribing witnesses.

JULES HUMBRECHT.

Witnesses:
 HENRY HASPER,
 WOLDEMAR HAUPT.